(12) United States Patent
Dreux

(10) Patent No.: US 9,624,715 B2
(45) Date of Patent: Apr. 18, 2017

(54) GLAZING PANEL INCLUDING GLASS SHEETS JOINED TOGETHER BY MEANS OF SPACERS AND CORRESPONDING METHOD FOR MANUFACTURING SAME

(75) Inventor: Priscille Dreux, Jumet (BE)

(73) Assignee: AGC Glass Europe, Brussels (Watermael-Boitsfort) (BE)

( * ) Notice: Subject to any disclaimer, the term of this patent is extended or adjusted under 35 U.S.C. 154(b) by 356 days.

(21) Appl. No.: 14/343,242

(22) PCT Filed: Jul. 18, 2012

(86) PCT No.: PCT/EP2012/064093
§ 371 (c)(1),
(2), (4) Date: Mar. 6, 2014

(87) PCT Pub. No.: WO2013/034348
PCT Pub. Date: Mar. 14, 2013

(65) Prior Publication Data
US 2014/0220268 A1 Aug. 7, 2014

(30) Foreign Application Priority Data

Sep. 7, 2011 (BE) .................................. 2011/0529

(51) Int. Cl.
*E06B 3/66* (2006.01)
*E06B 3/677* (2006.01)
(Continued)

(52) U.S. Cl.
CPC .......... *E06B 3/6775* (2013.01); *E06B 3/6612* (2013.01); *E06B 3/66304* (2013.01);
(Continued)

(58) Field of Classification Search
CPC ............... E06B 3/6612; E06B 3/66304; E06B 3/66309; Y02B 80/24
See application file for complete search history.

(56) References Cited

U.S. PATENT DOCUMENTS 5,005,557 A 4/1991 Baechli
5,009,218 A 4/1991 Baechli
(Continued)

FOREIGN PATENT DOCUMENTS

WO 87 03327 6/1987
WO WO 89/11020 A1 11/1989
WO 2011 061208 5/2011

OTHER PUBLICATIONS

International Search Report Issued Aug. 10, 2012 in PCT/EP12/064093 Filed Jul. 18, 2012.
U.S. Appl. No. 14/235,973, filed Jan. 29, 2014, Caliaro, et al.

*Primary Examiner* — Donald J Loney
(74) *Attorney, Agent, or Firm* — Oblon, McClelland, Maier & Neustadt, L.L.P.

(57) ABSTRACT

The invention relates to a glass panel including a first (5) and a second (5) glass sheet combined together via at least one spacer (8) that keeps the glass sheets at a certain distance from each other, wherein an inner gap (4) between said glass sheets (5) includes at least a first recess (41) in which a vacuum of lower than 1 mbar is formed, said recess being sealed by a peripheral seal arranged at the periphery of the glass sheets around said inner space (4), the seal (1) being a metal seal rigidly connected to the first and second glass sheets, respectively. According to the invention, the metal seal (1) further includes a means (11) for placing the inner gap (4) in communication with the outside of the panel, wherein said communication means can be sealed.

12 Claims, 3 Drawing Sheets

(51) Int. Cl.
    *E06B 3/663* (2006.01)
    *E06B 3/673* (2006.01)
(52) U.S. Cl.
    CPC ....... *E06B 3/66309* (2013.01); *E06B 3/67356* (2013.01); *Y02B 80/24* (2013.01)

(56) References Cited

U.S. PATENT DOCUMENTS 8,857,698 B2 * 10/2014 Bouesnard ............ C03C 27/046
                   148/405
2014/0130428 A1   5/2014 Dreux et al.

* cited by examiner

GLAZING PANEL INCLUDING GLASS SHEETS JOINED TOGETHER BY MEANS OF SPACERS AND CORRESPONDING METHOD FOR MANUFACTURING SAME

1. FIELD OF THE INVENTION

The field of the invention is that of glazing panels comprising glass sheets delimiting at least one internal space, in which a vacuum is created, also referred to as vacuum glazing units.

More specifically, the invention relates to the creation of the vacuum in such panels.

These panels can be used in any kind of application such as multi-purpose glazing units (furniture, partitions . . . ), glazing units for vehicles or for buildings.

2. SOLUTIONS OF THE PRIOR ART

A vacuum glazing unit, or vacuum insulating glazing, is typically composed of at least two glass sheets separated by an internal space, in which a vacuum has been created. Such a glazing unit is classically used for its high thermal insulation properties because of the vacuum. The thickness of the vacuum space is typically 80 μm to 800 μm.

In order to achieve high insulation performance rates (surface transfer coefficient U<0.6 W/m$^2$K), the pressure inside the glazing unit must generally be in the order of 10-3 mbar or less and generally at least one of the two glass sheets is coated with a low-emissivity layer with an emissivity ideally of less than 0.05. To obtain such a pressure inside the glazing unit, a seal is placed on the periphery of the two glass sheets and the vacuum is created inside the glazing unit by means of a pump. To prevent the glazing unit from collapsing under atmospheric pressure (because of the pressure difference between the inside and the outside of the glazing unit), spacers are placed at regular intervals (in the form of a matrix, for example) between the two glass sheets.

The spacers are generally cylindrical or spherical and are referred to as pillars. Nowadays, these spacers are generally made of metal and therefore create heat losses in the glazing unit. To maintain a heat transfer coefficient U of less than 0.6 W/m$^2$K, the total surface of the spacers in contact with the glass must represent less than 1% of the surface of the vacuum glazing unit.

Different seal technologies exist and each has certain disadvantages. A first type of seal (the most widespread) is a seal based on a soldering glass with a melting temperature lower than that of the glass of the glass panels of the glazing unit. The use of this type of seal limits the choice of low-emissivity layers to those that are not impaired by the thermal cycle necessary for usage of the soldering glass, i.e. to that which can withstand a temperature that can be as much as 350° C. Moreover, since this type of seal based on soldering glass has very little deformability, it does not enable the effects of differential expansions between the glass panel of the glazing on the internal side and the glass panel of the glazing on the external side to be absorbed, when these are subjected to large differences in temperature (40° C., for example). Quite significant stresses are then generated at the periphery of the glazing unit and can cause breakages of the glass panels of the glazing unit.

A second type of seal comprises a metal seal, e.g. a metal strip of low thickness (<500 μm) welded around the periphery of the glazing unit by means of a bonding sub-layer covered at least partially by a layer of a tin alloy soft solder-type solderable material. A significant advantage of this second type of seal compared to the first type of seal is that it can be deformed to absorb the differential expansions created between the two glass panels. There are different types of sub-layers for bonding onto the glass panel.

Patent Application No. WO2011/061208 A1 proposes an embodiment of a peripheral seal of the second type for vacuum glazing. According to this embodiment, the seal is a metal strip, of copper, for example, which is welded by means of a solderable material onto an adhesive band provided on the periphery of the glass sheets.

With respect to the formation of the vacuum in the internal space of the glass unit, a hollow glass tube connecting the internal space to the outside is generally provided on the main face of one of the glass sheets. The vacuum is thus created in the internal space by pumping the gases present into the internal space by means of a pump connected to the outer end of the glass tube. Patent Application No. EP 1506945 A1 describes the use of such a glass tube, which is welded in position in a through-hole provided in the main face of one of the glass sheets.

However, the provision of a hole in the main face of one of the glass sheets to allow the glass tube to then be inserted therein generates significant stresses around the hole in the glass sheet, which weaken this.

In addition, the glass tube constitutes a weak point of the vacuum glazing unit and thus requires it to be protected from impacts.

Moreover, this glass tube constitutes a protrusion on the surface of one of the glass sheets that is not aesthetically acceptable and therefore needs to be concealed.

3. OBJECTS OF THE INVENTION

An object of the invention in particular is to remedy these disadvantages of the prior art.

More precisely, an object of the invention in at least one of its embodiments is to provide a technique that enables a vacuum to be created in the internal space of a vacuum glazing unit, which generates less stress in the glass sheets of the panel than the classic techniques.

Another object of the invention in at least one of its embodiments is to provide such a technique that weakens the vacuum glazing unit less.

Another object of the invention in at least one of its embodiments is to provide such a technique, which impairs the aesthetic appearance of the panel less than the classic techniques.

Another object of the invention in at least one of its embodiments is to provide such a technique that is easy to implement.

A further object of the invention in at least one of its embodiments is to provide such a technique that is inexpensive.

4. OUTLINE OF THE INVENTION

In accordance with a particular embodiment, the invention relates to a glazing unit comprising a first and a second glass sheet joined together by means of at least one spacer, which holds them at a certain distance from one another, and between said glass sheets an internal space comprising at least one first cavity, in which a vacuum of less than 1 mbar prevails and which is closed by a peripheral seal arranged on the periphery of the glass sheets around said internal space, wherein the seal is a metal seal fixed to the first and second glass sheets respectively.

According to the invention the metal seal additionally comprises means for connecting the internal space with the outside of the panel, wherein said connection means are sealable.

The roles of the first and second glass sheets are, of course, interchangeable in all that follows.

Glass is, of course, understood to mean all types of glasses and equivalent transparent materials such as mineral glasses and organic glasses. Mineral glass can be formed equally from one or more types of glasses known as soda-lime glasses, boron glasses, crystalline and semi-crystalline glasses. Organic glass can be a transparent thermoset or rigid thermoplastic polymer or copolymer such as a polycarbonate synthesis resin, transparent polyester or polyvinyl, for example.

Thus, the means for connecting the internal space with the outside of the panel in a sealable manner enable the vacuum to be created in the internal space without it being necessary to use the glass tube classically provided in a hole formed in the main face of one of the glass sheets. Thus, this technique generates less stress in the glass sheets of the pane than the classic techniques.

Moreover, since it does not require a glass tube that forms a protrusion on one of the glass sheets, this technique weakens the vacuum glazing unit less and impairs the aesthetic appearance of the unit less.

Advantageously, the connection means comprise at least one hollow metal tube, of which a first end connects with the internal space and a second end connects with the outside of the unit, wherein the second end comprises means for sealing the tube.

According to the invention the connection means can also comprise an opening created in the seal, which can be sealed by any suitable means.

According to an advantageous feature of the invention, the means for sealing the tube comprise a plug formed by pinching the second end of the tube.

In fact, the inside surface portions of the tube that are in physical contact as a result of the pinching action generate atomic bonds between them at the level of their atomic layers on the surface, which thus form a cold weld, which is very strong and does not require the use of heat or soldering. Of course, according to the invention any other sealing technique and any other kind of plug can be used, e.g. a metal screw plug, to be inserted by force or to be welded onto an end of the tube.

Advantageously, the metal seal consists of at least one material selected from copper and its alloys, aluminium and its alloys, nickel and its alloys, in a non-oxidised state.

Advantageously, the metal tube consists of at least one material selected from copper and its alloys, aluminium and its alloys, nickel and its alloys, in a non-oxidised state.

In fact, since the inside surface portions of the tube that are in physical contact as a result of the pinching action are not oxidised, they thus generate still more atomic bonds, and this reinforces the strength of the cold weld.

Advantageously, the inside surface of the tube is firstly cleaned (e.g. by means of ultrasound) in order to reduce the presence of any contamination on this surface (which would reduce the bond creation and therefore the strength of the weld). For example, the inside surface is polished with an abrasive cloth, grain 320, to remove any oxide crystals.

According to an advantageous feature of the invention, the internal space of the unit also comprises a second cavity arranged between the metal seal and the edge of the unit, wherein the second cavity is closed by the metal seal.

Advantageously, the first end of the metal tube is contained in the second cavity.

In fact, in the case where the spacing between the two glass sheets is smaller than the outside diameter of the metal tube, the first end of the metal tube cannot be inserted into the first cavity of the internal space between the glass sheets, but can thus be inserted into the second cavity of the internal space between the metal seal and the edge of the unit.

Advantageously, the metal seal is fixed by welding to a first peripheral zone of the first glass sheet covered with a first adhesive coating and to a second peripheral zone of the second glass sheet covered with a second adhesive coating.

According to an advantageous feature of the invention, the metal seal consists of a metal strip pierced by a hole, in which the metal tube is arranged.

Advantageously, the metal tube is fixed to the metal strip by welding.

The invention also relates to a method for manufacturing a vacuum glazing unit comprising the following steps:
  joining together a first and a second glass sheet by means of at least one spacer, which holds them at a certain distance from one another, between said glass sheets an internal space forms a first cavity;
  closing the internal space by means of a peripheral seal arranged on the periphery of the glass sheets, around said internal space, wherein the seal is a metal seal fixed to the first and second glass sheets respectively;
  placing the internal space under vacuum in order to obtain a vacuum of less than 1 mbar.

According to the invention, the metal seal additionally comprises means for connecting the internal space with the outside of the unit, wherein said connecting means are sealable.

Advantageously, the connection means comprise at least one hollow metal tube, of which a first end connects with the internal space and a second end connects with the outside of the unit, and the method additionally comprises the following step:
  sealing the second end of the tube once the step of placing under vacuum has finished.

According to an advantageous feature of the invention, the sealing step is conducted by pinching the second end of the tube.

Advantageously, the metal seal is fixed by welding to a first peripheral zone of the first glass sheet covered with a first adhesive coating and to a second peripheral zone of the second glass sheet covered with a second adhesive coating.

Advantageously, the metal seal consists of a metal strip and the method includes a step of piercing the strip in order to form a hole and a step of inserting the metal tube into the hole.

According to an advantageous feature of the invention, the metal tube is fixed to the metal strip by welding.

5. LIST OF FIGURES

Other features and advantages of the invention will become clearer upon reading the following description of a preferred embodiment given by way of non-restrictive example and the attached drawings, wherein.

6. DESCRIPTION OF AN EMBODIMENT OF THE INVENTION

Figure 1:
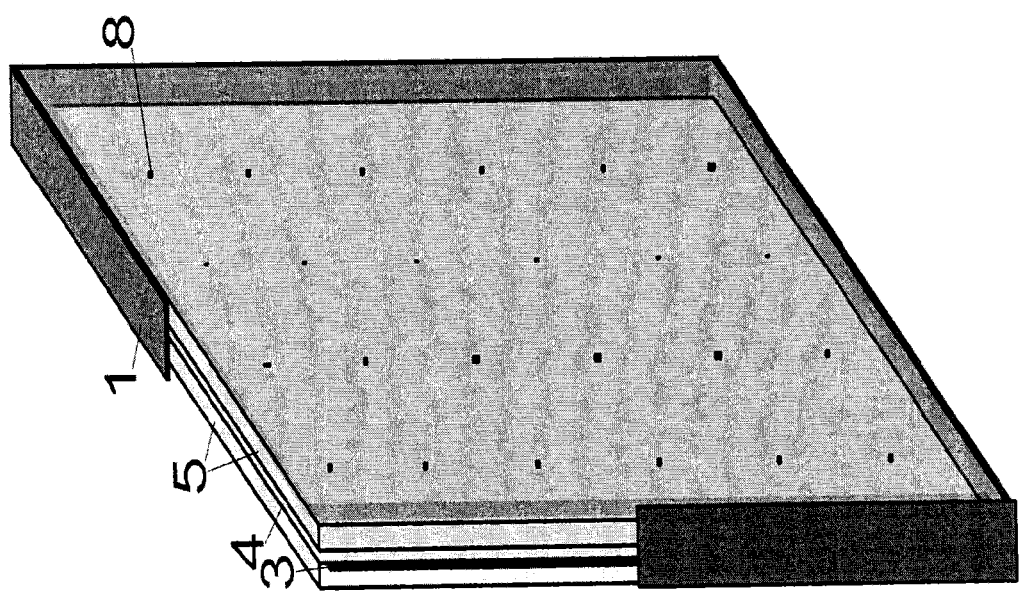
FIG. 1 is a diagram of a vacuum glazing unit according to an embodiment of the invention.

The present invention will be described with reference to particular embodiments and with reference to certain drawings, but the invention is not limited by this and is only limited by the claims. The size and relative dimensions of certain elements may be exaggerated in the drawings and may not be drawn to scale for illustrative reasons.

Moreover, the terms first, second, third and the like in the description and in the claims are used to distinguish between similar elements and not necessarily to describe a sequence, whether in time, space or for purposes of classification or other purposes. It should be understood that the terms thus used are interchangeable in appropriate circumstances and that the embodiments of the invention described here can function in other sequences than those described or illustrated here.

Moreover, the terms high, low, above, below and the like in the description and the claims are used for descriptive reasons and not necessarily to describe relative positions. It should be understood that the terms thus used are interchangeable in appropriate circumstances and that the embodiments of the invention described here can function in other sequences than those described or illustrated here.

It should be noted that the term "comprising" used in the claims should not be interpreted as being restricted to the elements listed thereafter and does not exclude other elements or steps. It should therefore be interpreted as specifying the presence of the specified elements, entities, steps or components referred to, but does not exclude the presence or addition of an element, entity, step or component, or group thereof. Therefore, the scope of the expression "a device comprising elements A and B" should not be limited to devices only consisting of components A and B. This means that as far as the present invention is concerned the only relevant components of the device are A and B.

As used here and unless indicated otherwise, "seal" is understood to mean seal against air or any other gas present in the atmosphere.

As used here and unless indicated otherwise, "thermal insulation layer" is understood to mean a metal oxide layer that has an emissivity of less than 0.2, preferably less than 0.1 and more preferred less than 0.05. A thermal insulation layer can be one of the following layers, for example: Planibel G, Planibel Top N, Top N+ and Top 1.0 supplied by AGC.

As used here and unless indicated otherwise, the term "spacer" relates to one or more elements that assure a relatively constant distance between two adjacent glazing units.

The following description will relate to the particular case of a glazing unit according to the invention that is a vacuum glazing unit. Naturally, the invention also relates to any type of glazing unit comprising glass sheets (two, three or more) delimiting internal spaces (also referred to as multiple glazing units) that are insulating or not, provided that a vacuum is created in at least one of the internal spaces.

For example, the invention also applies to a triple glazing unit comprising a first internal space, in which a vacuum is created, and a second internal space enclosing a cushion of gas, for example, but not exclusively dry air, argon (Ar), krypton (Kr), xenon (Xe), sulphur hexafluoride ($SF_6$) or even a mixture of some of these gases.

Naturally, other variants are conceivable, in particular replacing one of the glass sheets of the unit with a laminated glass sheet or by any other addition or modification.

With respect to FIG. 1, this shows an overall view of a vacuum glazing unit according to an embodiment of the invention.

The vacuum glazing unit comprises first and second glass sheets 5 (6 mm thick sheets of clear soda-lime-silica glass, for example) joined together by means of at least one spacer 8, which holds them at a certain distance from one another. Hence, the first and second glass sheets 5 are separated by a first internal space 4 that forms a first cavity 41. A vacuum of less than 1 mbar, e.g. equal to $10^{-3}$ mbar (obtained by pumping into the cavity by means of a vacuum pump), prevails in the internal space 4.

For example, the thickness of the internal space is in the order of 1 mm (of course, any other thickness of the internal space can be used).

To facilitate the pumping operation, the surfaces of the internal space can firstly be drained of gas, for example, by applying a flux of ozone to the surfaces of the internal space at a temperature of more than 100° C.

Any type of glass and thickness of glass can, of course, be used.

The vacuum glazing unit also comprises a plurality of spacers 8 according to the invention, wherein the spacers are sandwiched between the first and second glass sheets 5 in order to maintain the first space between these glass sheets 5.

For example, the spacers are arranged between the first and second glass sheets in order to form a matrix with a pitch in the range of between 20 and 80 mm and preferably in the range of between 30 and 60 mm.

The spacers 8 can be of different shapes such as cylindrical, spherical, hourglass-shaped, cross-shaped . . . .

The following description relates to an example according to the invention, in which the spacers 8 are made from AISI301 steel and configured in the shape of a C.

The step of shaping the austenitic steel firstly comprises a step of obtaining a wire with a cylindrical cross-section by wire drawing. The step of obtaining the wire can, of course, also be achieved by hot extrusion of said AISI301 steel, then wire drawing to obtain the final diameter of the wire.

For example, working from a wire of 5 mm in diameter on which the wire drawing operation is conducted, a refined wire with a diameter of 1 mm is obtained (which represents an 80% reduction in cross-section of the wire).

The step of shaping the austenitic steel then comprises a cutting step (e.g. by means of wire cutters) of at least one portion of the wire to form said spacer. The length of said portion of wire is 4 mm, for example.

According to an advantageous embodiment the step of shaping the austenitic steel then comprises a step of bending said portion of wire over at least one of its portions in order to shape a loop portion with a maximum radius of curvature of 0.5 mm.

The bending step can, of course, be conducted before the cutting step.

The portion of wire is preferably a segment of a circle with a radius of curvature of 0.5 mm.

Hence, in this second example the step of cold working is combined with the wire drawing step.

Thus, during the wire drawing operation an 80% reduction in cross-section of the wire causes an increase in the strength of the AISI stainless steel from 620 MPa to about 1400 MPa.

For example, if AISI spacers that are not cold worked (that therefore have a compressive strength of 620 MPa) are used, which have a contact surface equivalent to a disc with a radius of 250 µm with a spacing of 30 mm between these, a vacuum glazing unit having a U coefficient value equal to 0.8 W/(m²K) is obtained.

Conversely, using the aforementioned spacers according to the invention (made of cold-worked AISI 301 in a C shape), which have a compressive strength of 1400 MPa, it is possible to reduce the number of spacers by spacing them 50 mm apart while improving the U value, which becomes about 0.5 W/(m²K).

The U values of vacuum glazing units are estimated on the basis of a glazing described above including a low-emissivity type layer. The heat transmissions (U values) have been evaluated using the method described in the publication of the University of Sydney: Determination of the Overall Heat Transmission Coefficient (U-Value) of Vacuum Glazing, T M Simko, A H Elmandy and R E Collins, Ashrae Transactions, 105, pt. 2, pp 1-9, 1999.

In order to further improve performance rates in terms of thermal insulation, a thermal insulation layer can be arranged on an inside surface of at least one of the glass sheets 5.

The two glass sheets 5 are assembled in a gastight manner (assuring the vacuum) by means of a peripheral seal 1 placed on the periphery of the glass sheets 5 around the internal space 4 tightly closing the first cavity. Thus, the peripheral seal 1 closes the internal space in a sealed manner (against gases present outside the internal space).

The seal 1 is a metal seal 1 fixed to the first and second glass sheet 5 respectively.

Figure 2:
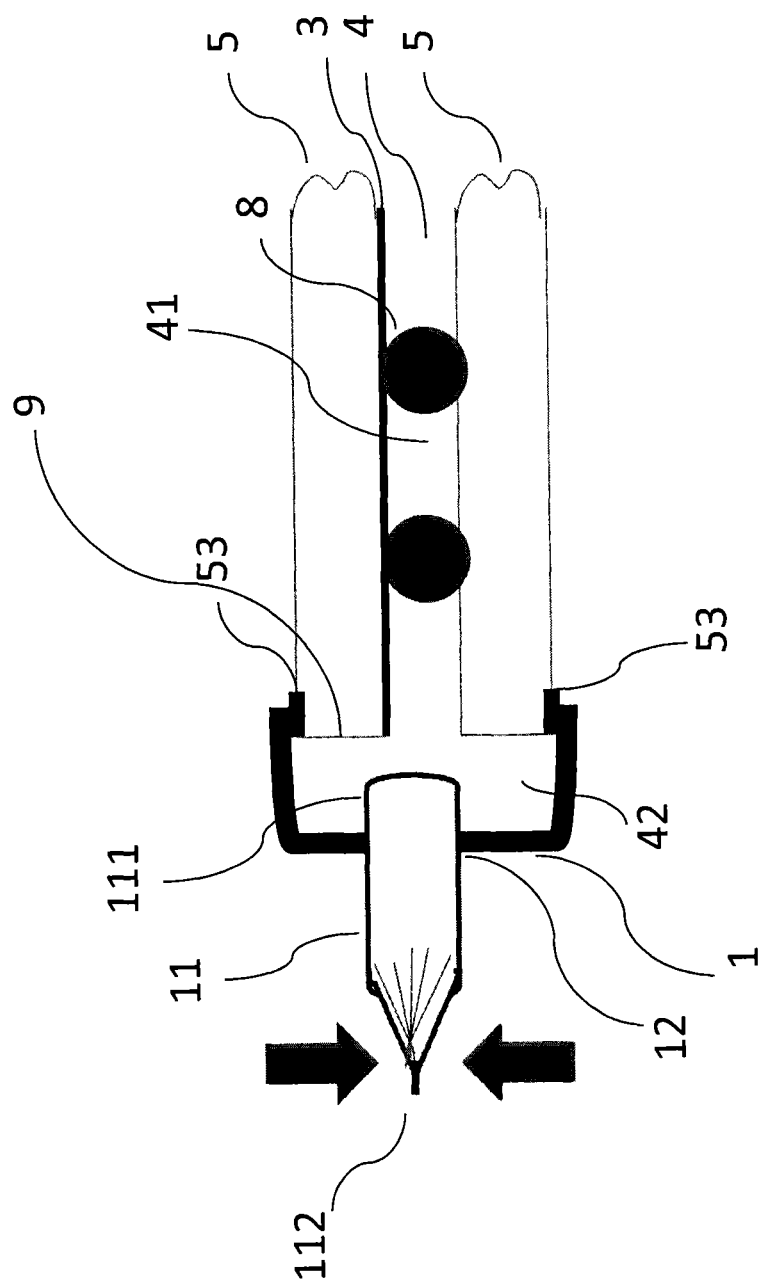
FIG. 2 shows a peripheral seal of the unit of the figure according to an embodiment of the invention.

With respect to FIG. 2, this shows a peripheral seal 1 of the unit of FIG. 1 according to an embodiment of the invention. Only a portion of the cross-section of the glazing unit is shown in FIG. 2.

For example, the metal seal 1 is fixed by welding (e.g. by means of a tin- and lead-based solder joint) to a first peripheral zone of the first glass sheet 5 covered with a first adhesive coating 53 and to a second peripheral zone of the second glass sheet 5 covered with a second adhesive coating 53.

The metal seal 1 comprises means 11 for connecting the internal space 4 to the outside of the unit, wherein the connection means 11 are sealable. For example, the connection means consist of a hollow metal tube 11 (of which the outside diameter is 4 mm, for example, and the inside diameter is 2 mm, for example), a first end in of which connects with the internal space 4 and a second end 112 connects with the outside of the unit, wherein the second end comprises means for sealing the tube. According to a variant of the invention, the connection means naturally comprise several such hollow metal tubes (e.g. two tubes, which can facilitate placement of the unit under vacuum, for example, and the use of possible degassing of the surfaces of the internal space of the unit).

For example, the metal seal 1 comprises a strip of copper in a non-oxidised state. The metal strip is pierced by a hole 12, in which the metal tube 11 is arranged. The metal tube 11 is fixed to the metal strip by welding (e.g. by means of a tin- and lead-based solder joint). For example, the metal tube is made from copper. It can, of course, be made from any other metal or metal alloy or alloy of metals, e.g. of nickel (or one of its alloys), of aluminium (or one of its alloys).

Advantageously, the metal tube 11 is made from OFHC (oxygen-free high conductivity) copper, also referred to by the term Cu-c2 or also Cu-OFE, that must have undergone an annealing operation between 650° and 850° C. for 30 minutes in a dry hydrogen atmosphere. In fact, this treatment is advantageous because the material will undergo a deformation of about 350% during pinching. Another type of material that can be used to form the tube 11 is high-purity nickel, e.g. a nickel A, N1270, N1200 or even 99.4% nickel according to standard ASTM-B161. For example, the tube 11 can have undergone an annealing operation at 1150° C. for 30 minutes before pinching. Finally, other materials such as aluminium, pure iron, gold, platinum, silver or even niobium are also suitable to form the tube 11.

The internal space 4 of the unit also comprises a second cavity 42 arranged between the metal seal 1 and the edge 9 of the unit, wherein the second cavity 42 is closed by the metal seal 1. The first end of the metal tube is contained in the second cavity 4.

For example, the means for sealing the tube 11 comprise a plug formed by pinching the second end 112 of the tube (of course, according to the invention any other sealing technique and any other type of plug can be used, e.g. a metal screw plug, for insertion by force or welding onto the second end of the tube 112). To perform the pinching of the second end 112 of the tube 11, a pinch-off tool that exerts a high pressure on the second end of the tube 11, for example, can be used, e.g. a pinch-off tool marketed under the name "Pinch-off tool manual series (or GST series or HAC series)" by C.H. Bull Co or a pinch-off tool marketed under the reference "Pinch-off tool HY-187 (or HY-250 or HY-500 or also HY-750, depending on the diameter of the tube 11) by Custom Products & Services.

Thus, the inside surface portions of the tube 11 that are in physical contact as a result of the pinching action generate atomic bonds between them at the level of their atomic layers on the surface, which thus form a cold weld, which is highly resistant and does not require the use of heat or soldering.

The fact that the copper of the tube is in a non-oxidised state means that the inside surface portions of the tube that are in physical contact as a result of the pinching action generate still more atomic bonds (compared to an oxidised state of the copper), and this reinforces the strength of the cold weld.

For example, the inside surface of the tube is firstly cleaned (e.g. by means of ultrasound) in order to reduce the presence of any contamination on this surface (which would reduce the bond creation and therefore the strength of the weld). For example, the inside surface is polished with an abrasive cloth, grain 320, to remove any oxide crystals. The outside surface of the tube can also be polished with an abrasive cloth, grain 320, to remove any oxide crystals and thus assure good operability of the aforementioned pinch-off tool.

For example, after the tube 11 is closed off by pinching the second end 112 of the tube 1, the second end 112 of the tube 11 as well as the outer surface of the tube located outside the unit can be covered by a protective coating, e.g. a metal alloy. The second end 112 of the tube 11 can also be protected by means of a plastic cap.

Moreover, the adhesive material forming the adhesive coatings 53 can be selected from the group consisting of copper and its alloys (e.g. with titanium and/or chromium), aluminium and its alloys, iron and its alloys (such as Fe—Ni austenitic steels: e.g. iron (50-55% by weight, e.g. 52% by weight), nickel (45-50% by weight, e.g. 48% by weight) such as alloy 48), the iron alloys comprising the following metals: iron (53-55% by weight, e.g. 53.5% by weight), nickel (28-30% by weight, e.g. 29% by weight) and cobalt (16-18% by weight, e.g. 17% by weight), and Kovar®, platinum and its alloys, nickel and its alloys, gold and its alloys, silver and its alloys, gallium arsenide and tin and its alloys. This list is not exhaustive.

The metal seal 1 can, of course, be formed in any other manner. For example, it can be in step form as described in patent application WO2011/061208 A1.

For example, it can also be formed by joining by welding two metal seal portions that are themselves welded to the glass sheets. Moreover, any other technique of fixing the seal to the recess(es) can be implemented without departing from the framework of the invention, e.g. soldering directly onto the glass using soldering glass (no adhesive coating 53 is necessary in this case) or by fitting together by force.

According to variants of the abovementioned embodiment that are not illustrated, the glazing unit can, of course, also comprise a third glass sheet separated from any one of the first and second glass sheets (e.g. from the second glass sheet) by a second space in order to form a second cavity.

According to a first variant, a second seal is additionally placed on the periphery of the third and second glass sheets in order to maintain the second space (e.g. with a thickness of 16 mm), wherein said second cavity is filled with at least one gas. The gas can, for example, be air, argon, nitrogen, krypton, xenon, $SF_6$, $CO_2$ or any other thermal insulation gas.

According to a second variant, the third and second glass sheets are assembled in a gastight manner (assuring the vacuum) by means of a seal placed on the periphery of the glass sheets tightly closing a second internal space and a plurality of spacers are sandwiched between the third and second glass sheets in order to maintain the second internal space between these glass sheets. A triple vacuum glazing unit is thus obtained.

Other variants are, of course, conceivable in particular replacing a glass sheet with a laminated glass panel or by any other addition or modification.

Figure 3:
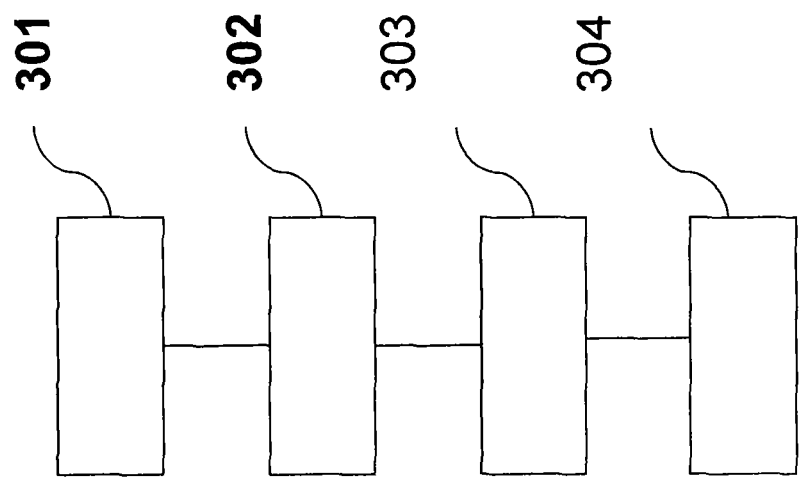
FIG. 3 illustrates a method for manufacturing a glazing unit according to an embodiment of the invention.

With respect to FIG. 3, this shows a method for manufacturing the vacuum glazing unit of FIG. 1 according to an embodiment of the invention.

The manufacturing method comprises the following steps:
joining 301 together the first and second glass sheets 5 by means of at least one spacer 8;
closing 302 the internal space 4 (between said glass sheets 5) by the metal peripheral seal 1 (comprising the metal strip and the hollow metal tube 11, of which a first end (111) connects with the internal space and a second end (112) connects with the outside of the unit) arranged on the periphery of the glass sheets 5 around said internal space 4;
placing under vacuum 303 the internal space 4 in order to obtain a vacuum of less than 1 mbar;
sealing 304 the second end 112 of the tube 11 once the step of placement under vacuum has finished, wherein the sealing is conducted by pinching the second end 112 of the tube 11.

According to the invention the closing step 302 comprises the following step:
fixing the metal joint by welding to the first peripheral zone of the first glass sheet covered with the first adhesive coating 53 and to the second peripheral zone of the second glass sheet covered with the second adhesive coating.

The method also includes a step of piercing the strip in order to form the hole 12, a step of inserting the metal tube 11 into the hole 12 and preferably a step of fixing the metal tube to the metal strip by welding.

The invention is, of course, not limited to the aforementioned exemplary embodiments.

The invention claimed is:

1. A glazing panel, comprising:
a first glass sheet and a second glass sheet joined together via at least one spacer holding the first and the second glass sheets at a certain distance from one another, and
between the first and the second glass sheets, an internal space comprising a first cavity,
wherein the first cavity has a vacuum of less than 1 mbar and is closed by a peripheral seal arranged on periphery of the first and the second glass sheets around the internal space,
wherein
the peripheral seal is a metal seal fixed to the first and second glass sheets respectively,
the metal seal comprises a sealable connector connecting the internal space with outside of the glazing panel,
the connector comprises a hollow metal tube, of which a first end connects with the internal space and a second end connects with outside of the glazing panel,
the second end comprises a sealer for sealing the metal tube, and
the sealer comprises a plug formed by pinching the second end of the metal tube forming a cold weld.

2. The glazing panel according to claim 1, wherein the metal tube comprises at least one material selected from the group consisting of copper, a copper alloy, aluminium, an aluminium alloy, nickel, and a nickel alloy, in a non-oxidised state.

3. The glazing panel according to claim 1, wherein
the internal space further comprises a second cavity arranged between the metal seal and an edge of the glazing panel, and
the second cavity is closed by the metal seal.

4. The glazing panel according to claim 3, wherein the first end of the metal tube is present within the second cavity.

5. The glazing panel according to claim 1, wherein the metal seal is fixed by welding to a first peripheral zone of the first glass sheet covered with a first adhesive coating and to a second peripheral zone of the second glass sheet covered with a second adhesive coating.

6. The glazing panel according to claim 1, wherein the metal seal comprises a metal strip pierced by a hole, in which the metal tube is present.

7. The glazing panel according to claim 6, wherein the metal tube is fixed to the metal strip by welding.

8. A method for manufacturing a vacuum glazing unit according to claim 1, the method comprising:
joining together a first glass sheet and a second glass sheet via at least one spacer, which holds the first and the second glass sheets at a certain distance from one another, and forming an internal space comprising a first cavity between the first and second glass sheets;
closing the internal space via a peripheral seal arranged on periphery of the first and the second glass sheets and around the internal space;
placing the internal space under vacuum in order to obtain a vacuum of less than 1 mbar; and
pinching the second end of the metal tube to seal the metal tube and to form the cold weld.

9. The method according to claim 8, wherein the metal seal is fixed by welding to a first peripheral zone of the first glass sheet covered with a first adhesive coating and to a second peripheral zone of the second glass sheet covered with a second adhesive coating.

10. The method according to claim 8, wherein
the metal seal comprises a metal strip, and
the method further comprises:
piercing the metal strip to form a hole and inserting the metal tube into the hole.

11. The method according to claim 10, wherein the metal tube is fixed to the strip by welding.

12. A glazing panel, comprising:
a first glass sheet and a second glass sheet joined together via at least one spacer holding the first and the second glass sheets at a certain distance from one another, and
between the first and the second glass sheets, an internal space comprising a first cavity,
wherein the first cavity has a vacuum of less than 1 mbar and is closed by a peripheral seal arranged on periphery of the first and the second glass sheets around the internal space,
wherein
the peripheral seal is a metal seal fixed to the first and second glass sheets respectively,
the metal seal comprises a sealable communication means for connecting the internal space with outside of the glazing panel,
the communication means comprises a hollow metal tube, of which a first end connects with the internal space and a second end connects with outside of the glazing panel,
the second end comprises a means for sealing the metal tube, and
the sealing means comprises a plug formed by pinching the second end of the metal tube forming a cold weld.

* * * * *